E. NIELSEN.
VARIABLE SPEED TRANSMISSION.
APPLICATION FILED AUG. 4, 1917.
1,380,006.
Patented May 31, 1921.
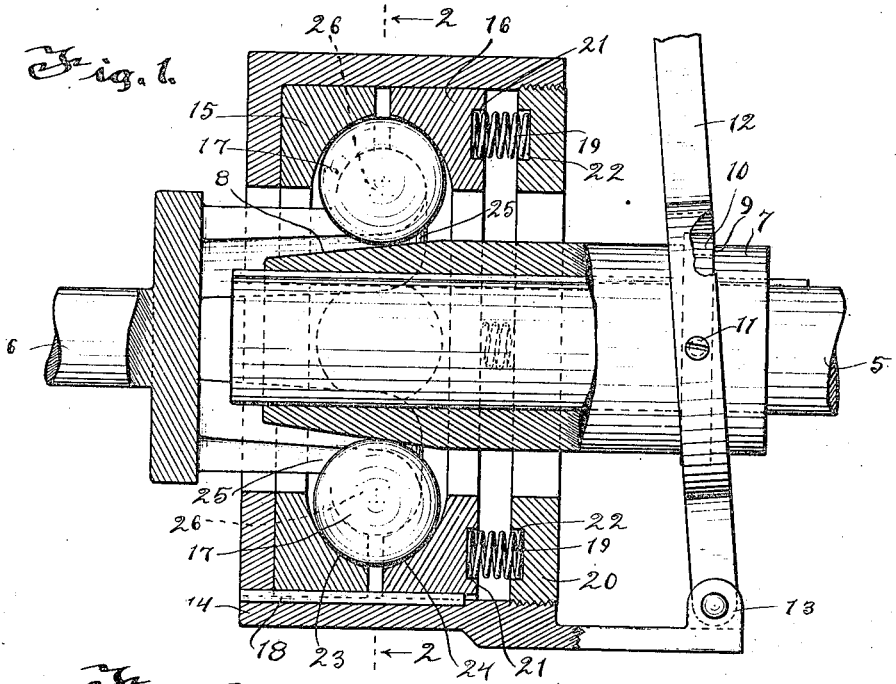
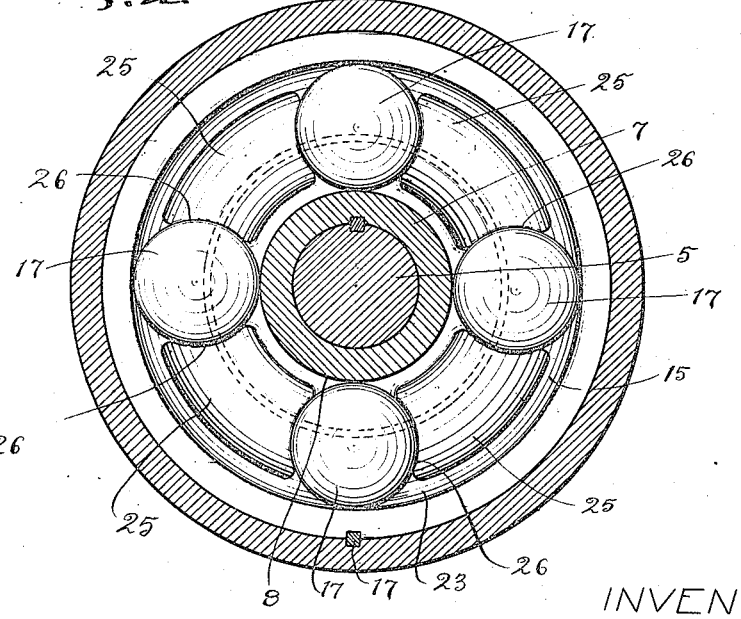
INVENTOR
Emanuel Nielsen
By Morsell, Keeney & French
ATTORNEYS

UNITED STATES PATENT OFFICE.

EMANUEL NIELSEN, OF RACINE, WISCONSIN, ASSIGNOR TO HAMILTON-BEACH MFG. CO., OF RACINE, WISCONSIN, A CORPORATION OF WISCONSIN.

VARIABLE-SPEED TRANSMISSION.

1,380,006.

Specification of Letters Patent.

Patented May 31, 1921.

Application filed August 4, 1917. Serial No. 184,415.

*To all whom it may concern:*

Be it known that I, EMANUEL NIELSEN, a citizen of the United States, and resident of Racine, in the county of Racine and State of Wisconsin, have invented new and useful Improvements in Variable-Speed Transmissions, of which the following is a description, reference being had to the accompanying drawings, which are a part of this specification.

This invention relates to improvements in variable speed transmission.

It is one of the objects of the present invention to provide a variable speed transmission of the planetary type in which the use of toothed gears is eliminated.

A further object of the invention is to provide a variable speed transmission in which the relative speed of rotation of one shaft transmitted to the other shaft may be varied at will in a very simple manner while the device is in operation.

A further object of the invention is to provide a variable speed transmission in which the relative speed of rotation of one shaft transmitted to the other shaft may be gradually varied at will and to the slightest degree in a very smooth manner without shock or jar.

A further object of the invention is to provide a variable speed transmission in which a plurality of spherical members are used for transmitting rotation from the driving member to the driven member at relative rates of speed which may be easily varied at will.

A further object of the invention is to provide a variable speed transmission in which either shaft or the transmission means therebetween may be used as the driving means and either one of the remaining members used as the driven means to produce various relative speed combinations and independent of the means controlling the speed of rotation of the driven member.

A further object of the invention is to provide a variable speed transmission which is of simple construction, is strong and durable and is well adapted for the purpose described.

With the above and other objects in view the invention consists of the improved variable speed transmission and its parts and combinations as set forth in the claims and all equivalents thereof.

In the accompanying drawing in which the same reference characters indicate the same parts in all of the views:

Figure 1 is a longitudinal sectional view of the improved variable speed transmission; and Fig. 2 is a transverse sectional view taken on line 2—2 of Fig. 1.

For convenience in describing the transmission one of the shafts will be referred to as the driving shaft, the other shaft as the driven shaft and another part as the stationary member but these terms are only relative and it is to be understood that either part mentioned may be used as the driving or the driven or the stationary means to produce different speed ratios.

Now referring to the drawing the numeral 5 indicates a shaft which in one use of the variable speed transmission may be called the driving shaft and 6 the driven shaft. Both shafts are approximately in axial alinement with each other with their shaft ends adjacent. The cone shaft 5 has keyed thereon a slidable sleeve 7 which is provided with a conical end portion 8 and an annular groove 9 for receiving bearing portions 10. The bearing portions 10 are engaged by screw pivots 11 which are carried by a controlling lever 12. This lever is pivoted at one end to a support 13 to provide for longitudinally adjusting the position of the slidable sleeve on the shaft 5.

A casing 14 surrounding the sleeve 7 and spaced therefrom is provided with a relatively fixed ball race 15 and a slidable ball race 16 for holding transmission elements or balls 17 between said races and the conical portion 8 of the sleeve. A key 18 locks both ball races against rotation with relation to the casing, and coiled springs 19 interposed between the slidable ball race 16 and a removable head member 20 threaded into one end portion of the casing holds the slidable ball race yieldingly in position. The slidable ball race and the head member both have recessed portions 21 and 22 into which the springs extend for maintaining the springs in position.

The ball races are provided with adjacent annular ball grooves 23 and 24 which in cross section are of a diameter greater than the diameter of the transmission elements or balls so that as the slidable ball race member 16 is moved closer to the fixed race member 15 their points of engagement with the balls will move closer to the axis of revolution and thus decrease the speed of rotation transmitted thereby. The position of engagement of the ball races is adjusted by sliding the sleeve 7 forwardly or backwardly. As the sleeve is moved forwardly or toward the left with respect to Fig. 1 the balls are forced radially outwardly and the ball races will be forced away from each other and the balls at points approximately at right angles to their axis of rotation will engage the portions of the ball grooves of larger diameter and increase the speed of rotation transmitted by the balls.

The end portion of the driven shaft 6 is provided with projecting fingers 25 having grooved ball engaging portions 26 which extend between the balls and maintain them in spaced relation circumferentially.

In the form shown in the drawing and assuming that the casing is stationary and the shaft 5 is the driving shaft, the shaft 6 will be driven in the same direction at a slower rate of speed and at a ratio equal to the difference in diameters of the lines of travel of the engaged portions of the balls and the ball races and the conical portion of the sleeve. For example if it requires five revolutions of the driven shaft to roll the balls once around the ball races the driven shaft will be turned one revolution. If we now assume that the shaft 6 is the driving shaft and the shaft 5 is the driven shaft the said driven shaft will be rotated in the same direction at a faster rate of speed than the shaft 6.

If we now maintain the shaft 6 fixed and drive with the cone shaft 5 the casing 14 will be the driven member and will be rotated at a slower rate of speed in the opposite direction to the direction of rotation of the shaft 5.

With the shaft 6 fixed and driving with the casing 14 the shaft cone 5 will be rotated at a faster speed and in the opposite direction.

With the cone shaft 5 stationary and driving with the shaft 6 the casing 14 will be rotated in the same direction at a faster rate of speed.

With the cone shaft 5 stationary and driving with the casing the shaft 6 will be rotated in the same direction at a slower rate of speed.

From the foregoing description it will be seen that the variable speed transmission may be used in many different ways to produce different drives and in addition the conical sleeve may be adjusted to vary the ratio of speed between the driving member and the driven member.

What I claim as my invention is:

1. A variable speed transmission, comprising a driving member, a driven member, a plurality of spherical members adjacent said driving and driven members, and means including a ball race for causing the spherical members to engage different portions of the driving and driven members of relatively different diameters for changing the ratio of speed of rotation of the driven member with relation to the driving member and for maintaining the spherical members in working position, one of said parts being maintained against rotation.

2. A variable speed transmission, comprising a driving shaft, a driven shaft, a plurality of spherical members adjacent the shafts for transmitting rotation from one shaft to the other, and means including a ball race and a conical member having portions of relatively different diameters which are adjustably engaged by the spherical members for changing the ratio of speed of rotation of one shaft with relation to the other shaft and for maintaining the spherical members in working position, one of said parts being maintained against rotation.

3. A variable speed transmission, comprising a driving shaft, a driven shaft approximately in axial alinement therewith, a plurality of balls adjacent the shafts for transmitting motion from one shaft to the other, a cone member slidably mounted on one of the shafts and having bearing portions of relatively different diameters which are adjustably engaged by the balls for changing the ratio of speed of one shaft with relation to the other, and a ball race member for maintaining the balls in working position.

4. A variable speed transmission, comprising a driving shaft, a driven shaft approximately in axial alinement therewith, a plurality of balls adjacent the shafts for transmitting motion from one shaft to the other, a cone member slidably mounted on one of the shafts for changing the ratio of speed of rotation of one shaft with relation to the other, a two part ball race member for maintaining the balls in working position, and a yielding means engaging one part of the two part ball race member.

5. A variable speed transmission, comprising a driving shaft, a driven shaft approximately in axial alinement therewith, a plurality of balls adjacent the shafts for transmitting motion from one shaft to the other, a cone member slidably mounted on one of the shafts for changing the ratio of speed of rotation of one shaft with relation to the other, a two part ball race member for maintaining the balls in working position, said race members having annular race grooves of curved form in cross section for receiving the balls, and means maintaining one part of the race member yieldingly in engagement with the balls.

6. A variable speed transmission, comprising a driving shaft, a driven shaft approximately in axial alinement therewith, a plurality of balls adjacent the shafts for transmitting motion from one shaft to the other, a cone member slidably mounted on one of the shafts for changing the ratio of speed of rotation of one shaft with relation to the other, a casing surrounding the balls and provided with a part ball race which engages the balls, and another part ball race yieldingly mounted within the casing and engaging the balls.

7. A variable speed transmission, comprising a pair of shafts in approximately axial alined position, a plurality of balls adjacent the shafts for frictionally transmitting rotation from one shaft to the other shaft at a variable rate of speed, a sleeve slidably keyed on one of the shafts and having a conical portion with bearing surfaces of varying diameters which are adjustably engaged by the balls for varying the speed of rotation of the driven member, means for adjusting the sleeve longitudinally, and a ball race means for maintaining the balls in working position, one of said parts being maintained against rotation.

8. A variable speed transmission, comprising a pair of shafts in approximately axial alined position, a plurality of balls adjacent the shafts for frictionally transmitting rotation from one shaft to the other shaft at a variable rate of speed, and means including a ball race for adjusting the relative working diameters of the same parts for controlling the relative speed of rotation of the driven member and for maintaining the balls in working position, one of said parts being maintained against rotation.

9. A variable speed transmission, comprising a driving shaft, a driven shaft in approximately axial alinement therewith, a sleeve slidably keyed on the driving shaft and having conical portions, a casing surrounding the conical portion and provided with a part ball race, another part ball race yieldingly positioned within the casing, said races having annular ball grooves curved in cross section, the diameters of said curves being greater than the diameters of the balls they engage, balls interposed between the ball races and the conical portion of the sleeve, said driven shaft having fingers projecting therefrom which extend between the balls, and means for adjusting the position of the sleeve.

10. A variable speed transmission, comprising a pair of shafts in approximately axial alinement, one of said shafts having projecting fingers which extend toward the other shaft, a conical sleeve keyed on the other shaft, a ball race casing surrounding the fingers, balls within the casing and between the fingers and engaging the conical sleeves, and means for adjusting the sleeve.

11. A variable speed transmission, comprising a pair of shafts in approximately axial alinement, one of said shafts having projecting fingers which extend toward the other shaft, a conical sleeve keyed on the other shaft, a ball race casing surrounding the fingers and having a fixed ball race portion and a yielding ball race portion, balls within the casing and between the fingers and engaging the conical sleeve and the ball race portions, and means for adjusting the sleeve.

In testimony whereof I affix my signature.

EMANUEL NIELSON.